(12) United States Patent
Kinnunen et al.

(10) Patent No.: US 11,494,817 B2
(45) Date of Patent: Nov. 8, 2022

(54) MARKET FOR SELLING AND SHARING MOBILE DATA

(71) Applicant: Sony Mobile Communications Inc., Tokyo (JP)

(72) Inventors: Henrik Kinnunen, Lund (SE); Alexander Bladh, Lund (SE); Anders Kavcic, Lund (SE); Johan Helgertz, Lund (SE); Lars Novak, Lund (SE); Kristofer Ringner, Lund (SE); Jonas Graudums, Lund (SE); Björn Smedman, Lund (SE)

(73) Assignee: Sony Group Corporation, Tokyo (JP)

( * ) Notice: Subject to any disclaimer, the term of this patent is extended or adjusted under 35 U.S.C. 154(b) by 424 days.

(21) Appl. No.: 16/070,579

(22) PCT Filed: Feb. 13, 2017

(86) PCT No.: PCT/IB2017/050780
§ 371 (c)(1),
(2) Date: Jul. 17, 2018

(87) PCT Pub. No.: WO2017/144997
PCT Pub. Date: Aug. 31, 2017

(65) Prior Publication Data
US 2021/0209663 A1 Jul. 8, 2021

(30) Foreign Application Priority Data
Feb. 22, 2016 (EP) ..................................... 16156759

(51) Int. Cl.
*G06Q 30/06* (2012.01)
*H04W 4/80* (2018.01)
(Continued)

(52) U.S. Cl.
CPC ........ *G06Q 30/0611* (2013.01); *H04W 4/023* (2013.01); *H04W 4/80* (2018.02);
(Continued)

(58) Field of Classification Search
CPC ............................... H04W 76/14; H04W 4/80
See application file for complete search history.

(56) References Cited

U.S. PATENT DOCUMENTS

2005/0135305 A1* 6/2005 Wentink ................ H04W 88/04
370/329
2011/0258313 A1* 10/2011 Mallik ................ H04L 67/1063
709/224

(Continued)

FOREIGN PATENT DOCUMENTS

| CN | 103581828 A | 2/2014 |
|---|---|---|
| CN | 104429054 A | 3/2015 |
| WO | 2016019796 A1 | 2/2016 |

OTHER PUBLICATIONS

Office Action from corresponding Chinese Application No. 201780012741.3 dated Nov. 4, 2020.
(Continued)

*Primary Examiner* — Wen W Huang
(74) *Attorney, Agent, or Firm* — Tucker Ellis LLP

(57) ABSTRACT

The present invention relates to a method for setting up a connection between a seller device (10) and a buyer device (30) for enabling the buyer device (30) to send and receive data via the seller (10). The method comprises sending, from the seller device (10) to a server (20), data pertaining to an offer (12), the data pertaining to the offer including an identification of the seller device (10); storing the data pertaining to the offer (12) in a memory of the server (20), the memory being configured to store data pertaining to at least one offer from a at least one seller device; sending, from the buyer device (30) to the server (20), a request (32)
(Continued)

for a list of nearby seller devices; at the server (20), compiling, from the data pertaining to the at least one offer stored in the memory, the list of nearby seller devices, by identifying one or more seller devices being positioned in proximity of a position of the buyer device (30), the list of nearby seller devices comprising the data pertaining to the offers of the identified one or more seller devices; sending, from the server (20) to the buyer device (30), the list of nearby seller devices; and sending, from the buyer device (30) to at least one of the seller devices (10) of the list of nearby seller devices, a connection request (36) for connecting the buyer device (30) to the at least one of the seller devices (10), thereby enabling the buyer device (30) to send and receive data via the seller device (10).

15 Claims, 4 Drawing Sheets

(51) Int. Cl.
    *H04W 4/02*           (2018.01)
    *H04W 8/00*           (2009.01)
    *H04W 74/00*         (2009.01)
    *H04W 84/12*         (2009.01)

(52) U.S. Cl.
    CPC ........... *H04W 8/005* (2013.01); *H04W 74/00* (2013.01); *H04W 84/12* (2013.01)

(56) References Cited

U.S. PATENT DOCUMENTS

| | | | | |
|---|---|---|---|---|
| 2013/0149994 A1* | 6/2013 | Gaddam | ............... | H04M 15/28 455/406 |
| 2013/0190005 A1* | 7/2013 | Shrivastava | .......... | H04W 76/14 455/456.1 |
| 2014/0105178 A1* | 4/2014 | Jang | ....................... | H04W 76/23 370/331 |
| 2014/0134999 A1* | 5/2014 | Scheessele | ............ | H04W 76/10 455/426.1 |
| 2014/0219261 A1* | 8/2014 | Johnsson | ............... | H04W 76/14 370/338 |
| 2014/0220927 A1 | 8/2014 | Girard | | |
| 2014/0355519 A1* | 12/2014 | Li | ........................ | H04W 76/14 370/328 |
| 2014/0357269 A1* | 12/2014 | Zhou | ..................... | H04W 76/14 455/434 |
| 2015/0056987 A1* | 2/2015 | Li | ........................ | H04W 76/14 455/434 |
| 2015/0163842 A1* | 6/2015 | Kalhan | ................. | H04W 84/18 455/500 |
| 2015/0382174 A1* | 12/2015 | Guo | ...................... | H04W 48/08 370/311 |
| 2016/0028572 A1* | 1/2016 | Suzuki | .................. | H04W 8/005 370/281 |
| 2016/0142913 A1* | 5/2016 | Ghosh | ................... | H04W 8/005 726/5 |
| 2017/0141932 A1* | 5/2017 | Tang | ..................... | H04W 76/14 |

OTHER PUBLICATIONS

International Search Report and Written Opinion from corresponding International Application No. PCT/IB2017/050780, dated May 11, 2017.

Samsung: "Samsung Galaxy Note Edge user Manual", Nov. 1, 2014, 198 pages.

\* cited by examiner

MARKET FOR SELLING AND SHARING MOBILE DATA

TECHNICAL FIELD

The present invention relates to a method for setting up a connection between a seller and a buyer for enabling the buyer to send and receive mobile data via the seller.

BACKGROUND

Demand for mobile data (i.e., Internet access on the go) is being met through a multitude of technologies: wide area wireless networking technologies such as WCDMA and LTE, local area wireless networking technologies such as IEEE 802.11 and personal area wireless networking technologies such as Bluetooth.

Wide area wireless networks can typically only be accessed if the user has a contract with the network operator, including a so-called data plan. A data plan may include an unlimited amount of mobile data, but is usually capped to a maximum monthly consumption, measured in megabytes. On the one hand, when the allotted amount of mobile data has been consumed, the bandwidth of the connection is often artificially reduced and the user may be offered the option to purchase additional mobile data from the operator. On the other hand, if a portion of the allotted consumption has not been consumed in a given month, that portion is often entirely forfeited by the user, without any compensation from the operator. A data plan may allow (or disallow) sharing of a portion of the allotted monthly consumption with other users through a mechanism called tethering.

A user may, however, still lack a satisfying mobile Internet connection for several reasons: (i) the user may not have a data plan; (ii) the user may have already consumed their allotted monthly mobile data and be unable or unwilling to purchase additional mobile data from the operator; (iii) the user may be travelling, having no access to present wide area networks except through roaming, which may be prohibitively expensive; (iv) and the user may be connected to a congested local area network.

Hence, there is a long-felt need in the technical field of mobile communications and systems of overcoming the abovementioned drawbacks of the state-of-the-art solutions.

SUMMARY OF THE INVENTION

An object of the invention is to provide an improvement to the state-of-the-art. A further object of the invention is to solve the aforementioned drawbacks of the prior art by creating a market where potential buyers can find potential sellers and where data can be transferred between buyers and sellers in exchange for some form of compensation (e.g., money and/or reputation, etc.).

According to a first aspect a method for setting up a connection between a seller device and a buyer device for enabling the buyer device to send and receive data via the seller device is provided. The method comprising: sending, from the seller device to a server, data pertaining to an offer, the data pertaining to the offer including an identification of the seller device; storing the data pertaining to the offer in a memory of the server, the memory being configured to store data pertaining to at least one offer from at least one seller device; sending, from the buyer device to the server, a request for a list of nearby seller devices; at the server, compiling, from the data pertaining to the at least one offer stored in the memory, the list of nearby seller devices, by identifying one or more seller devices being in proximity of the buyer device, the list of nearby seller devices comprising the data pertaining to the offers of the identified one or more seller devices; sending, from the server to the buyer device, the list of nearby seller devices; and sending, from the buyer device to at least one of the seller devices of the list of nearby seller devices, a connection request for connecting the buyer device to the at least one of the seller devices, thereby enabling the buyer device to send and receive data via the seller.

The data pertaining to the offer sent from the seller device may further include a position of the seller device, wherein the request sent from the buyer device may include a position of the buyer device, and wherein the act of identifying of the one or more seller devices being in proximity of the buyer device may be based on the position of the one or more seller devices and the position of the buyer device.

The method may further comprise sending a set of WiFi BSSIDs that are within WiFi range of the server to the server, wherein the act of identifying the one or more sellers being in proximity of the buyer may be based on a computation of an intersection of the buyer and sellers set.

The method may further comprise sending, from the server to at least one of the seller devices of the list of nearby seller devices, an instruction to enable a short-range communication means of the at least one of the seller devices.

The method may further comprise scanning, by the buyer device, for devices within short-range communication to verify that the at least one seller device of the list of nearby seller devices is actually within short-range connectivity.

The data pertaining to the offer may further include a channel quality indicator with respect to a network node the seller device being connected to, wherein the method may further comprise: selecting, at the buyer device, the at least one of the seller devices of the list of nearby seller devices to send the connection request to, based on the channel quality indicator of the seller devices of the list of nearby seller devices.

The data pertaining to the offer may further include a channel quality indicator with respect to a network node the seller device being connected to, wherein the act of identifying the one or more seller devices being in proximity of the buyer device may be based on the channel quality indicator of the seller devices.

The method may further comprise, while the connection is active, reporting, from the buyer device to the server, the amount of data sent and received by the buyer device.

The method may further comprise, while the connection is active, reporting, from the seller device to the server, the amount of data sent and received by the buyer device.

The method may further comprise, upon the amount of data sent and received by the buyer device reported by the buyer device and seller device differ more than 5%, terminating the connection between the buyer device and the seller device.

The method may further comprise, upon the buyer device has used a predetermined amount of data, sending, from the buyer device to the server, a message comprising instructions to disconnect the connection.

The method may further comprise notifying, by the server, the seller device of the disconnection by instructing it to disable a short-range communication means of the seller device.

The method may further comprise storing a record of the connection between the buyer device and seller device.

The method may further comprise, upon the amount of data sent and received by the buyer device has reached a predetermined threshold, terminating, by the seller device, the connection between the buyer device and the seller device.

According to a second aspect a method for enabling a buyer device to send and receive data via a seller device is provided. The method comprising: sending, to a server, a request for a list of nearby seller devices; receiving, from the server the list of nearby seller devices; and sending, to at least one of the seller devices of the list of nearby seller devices, a connection request for connecting the buyer device to the at least one of the seller devices enabling the buyer device to send and receive data via the seller device.

The request may include a position of the buyer device.

The method may further comprise scanning for devices within short-range communication to verify that the at least one seller device of the list of nearby seller devices is actually within short-range connectivity.

The list of nearby seller devices may comprise data pertaining to a channel quality indicator with respect to a network node of the nearby seller devices the respective seller device being connected to, wherein the method may further comprise: selecting the at least one of the seller devices of the list of nearby seller devices to send the connection request to, based on the channel quality indicator of the seller devices of the list of nearby seller devices.

The method may further comprise, while the connection is active, reporting, to the server, the amount of data sent and received by the buyer device.

The method may further comprise, upon a predetermined amount of data has been used by the buyer device, sending, to the server, a message comprising instructions to disconnect the connection.

According to third aspect a method for providing a buyer device with at least one seller device is provided. The method comprising: receiving, from a seller device data pertaining to an offer, the data pertaining to the offer including an identification of the seller device; storing the data pertaining to the offer in a memory of the server, the memory is configured to comprise data pertaining to at least one offer from at least one seller device; receiving, from a buyer device, a request for a list of nearby seller devices; compiling, from the data pertaining to at least one offer stored in the memory, the list of nearby seller devices, by identifying one or more seller devices being in proximity of the buyer device, the list of nearby seller devices comprising the data pertaining to the offers of the identified one or more seller devices; and sending, to the buyer device, the list of nearby seller devices.

The data pertaining to the offer received from seller device may further includes a position of the seller device, wherein the request received from the buyer device may include a position of the buyer device, and wherein the act of identifying the one or more seller devices being in proximity of the buyer device may be based on the position of the one or more seller devices and the position of the buyer device.

The method may further comprise receiving a set of WiFi BSSIDs that are within WiFi of the server; and identifying the one or more seller devices being in proximity of the buyer device based on a computation of an intersection of the buyer and sellers set.

The method may further comprise sending, to at least one of the seller devices of the list of nearby seller devices, instructions to enable a short-range communication means of the at least one of the seller devices.

The method may further comprise receiving a report from the buyer device reporting the amount of data sent and received by the buyer device.

The method may further comprise receiving a report from the seller device reporting the amount of data sent and received by the buyer device.

The method may further comprise, upon the amount of data sent and received by the buyer device reported by the buyer device and seller device differ more than 5%, terminating the connection between the buyer device and the seller device.

The method may further comprise, upon receipt of a disconnection message from the buyer device notifying the seller device to disconnect the buyer device.

The method may further comprise storing a record of the connection between buyer device and seller device.

According to a fourth aspect a non-transitory computer readable recording medium is provided. The non-transitory computer readable recording medium having recorded thereon a program which, when executed on an electronic device, in the form of a buyer device, having processing capabilities, is configured to perform the method according to the second aspect.

According to a fifth aspect a non-transitory computer readable recording medium is provided. The non-transitory computer readable recording medium having recorded thereon a program which, when executed on an electronic device, in the form of a server, having processing capabilities, is configured to perform the method according to the third aspect.

According to a sixth aspect a system comprising a seller device; a server and a buyer device is provided. The seller device is configured to send data pertaining to an offer to the server, the data pertaining to the offer including an identification of the seller device. The server comprises a memory configured to store data pertaining to at least one offer from at least one seller device. The buyer device is configured to send a request for a list of nearby seller devices to the server. The server is configured to, from the data pertaining to the at least one offer stored in the memory, compile the list of nearby seller devices, by identifying one or more seller devices being in proximity of the buyer device, the list of nearby seller devices comprising the data pertaining to the offers of the identified one or more seller devices. The server is configured to send the list of nearby seller devices to the buyer device. The buyer device is configured to send a connection request for connecting the buyer device to at least one of the seller devices of the list of nearby seller devices, thereby enabling the buyer device to send and receive data via the seller.

The above mentioned features of the method according to the first aspects, when applicable, apply to this sixth aspect as well. In order to avoid undue repetition, reference is made to the above.

According to a seventh aspect a buyer device is provided. The buyer device is configured to: send a request for a list of nearby seller devices to a server; receive the list of nearby seller devices from the server; and send a connection request for connecting the buyer device to at least one of the seller devices of the list of nearby seller devices, thus enabling the buyer device to send and receive data via the seller device.

The above mentioned features of the methods according to the first and second aspects, when applicable, apply to this eighth aspect as well. In order to avoid undue repetition, reference is made to the above.

According to an eighth aspect a server is provided. The server is configured to: from a seller device receive data pertaining to an offer, the data pertaining to the offer including an identification of the seller device; store the data pertaining to the offer in a memory of the server, the memory is configured to comprise data pertaining to at least one offer from at least one seller device; from a buyer device receive a request for a list of nearby seller devices; compile, from the data pertaining to at least one offer stored in the memory, the list of nearby seller devices, by identifying one or more seller devices being in proximity of the buyer device, the list of nearby seller devices comprising the data pertaining to the offers of the identified one or more seller devices; and send the list of nearby seller devices to the buyer device.

The above mentioned features of the methods according to the first and third aspects, when applicable, apply to this eighth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

A potential seller may install an application and configure it to indicate that they would like to sell their surplus data. The potential seller may also configure a maximum amount of data to sell and/or a minimum price and/or a schedule notifying sellers when and where they are willing to sell mobile data. Once configured, the application may partially or completely automate the process of selling the user's surplus mobile data. Hereafter, we use the term "seller" to refer either to the user (in the case of partial automation) or to the application installed by the user (in the case of complete automation).

A potential buyer may install the same application and configure it to indicate that they would like to purchase mobile data. The potential buyer may also configure a maximum amount of mobile data to buy and/or a maximum price and/or a maximum total cost. Once configured, the application may partially or completely automate the process of purchasing mobile data. Hereafter, we use the term "buyer" to refer either to the user (in the case of partial automation) or to the application installed by the user (in the case of complete automation).

Thus, there may be, in a certain location, users with a surplus of mobile data and users with a need for additional mobile data. When a buyer and a seller come into proximity, this event is detected by the system. If a mutually beneficial economic exchange between buyer and seller is possible (e.g., the buyer's maximum price is higher than the seller's minimum price), the system may instruct the seller to enable its tethering mechanism, and optionally to configure its access restrictions, to allow the buyer to connect. The system may also instruct the buyer to connect to the seller and provide, if necessary, any credentials needed to do so.

In an exemplary embodiment of the invention, the system comprises at least two devices 10, 20 (e.g., smartphones) and a server 20. The two devices will below be referred to as a seller 10 and a buyer 30. Hereafter, an exemplary method employed by the system is described.

Figure 1:
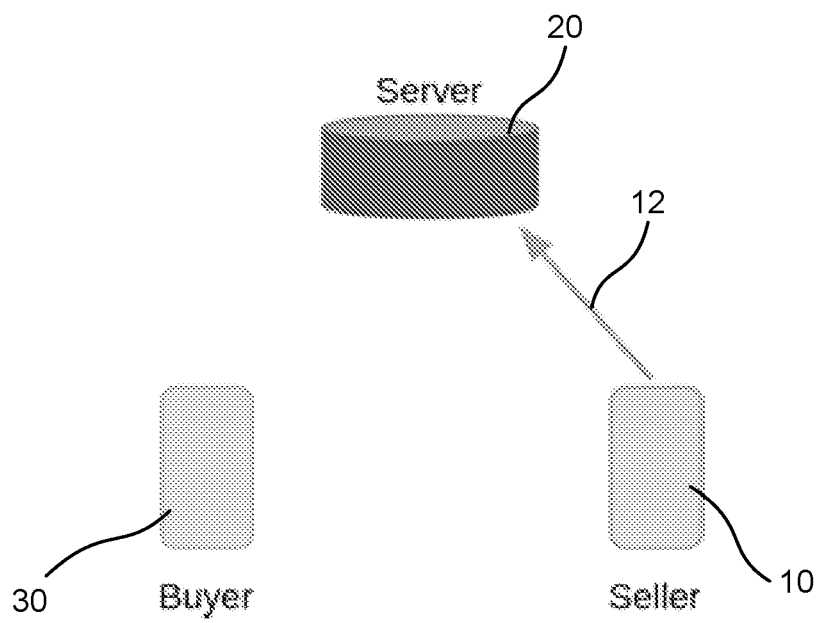
FIGS. 1-8 illustrates different acts of a system for setting up a connection between a seller and a buyer for enabling the buyer to send and receive mobile data via the seller

As illustrated in FIG. 1, the seller 10 posts an offer 12 to the server 20. The offer 12 may include price, position of the seller, amount of data for sale, SSID, password, wide area network connection metadata such as network type, and signal strength with respect to base station(s), access point(s), etc. The server 20 may store this information in a memory.

Figure 2:
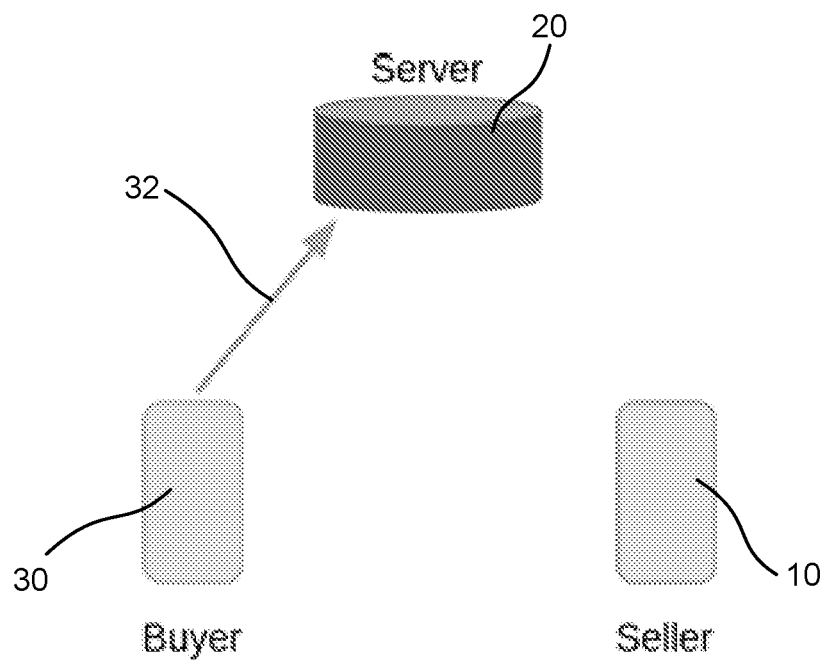

As illustrated in FIG. 2, the buyer 30 requests 32 the server 20 to return a list of nearby sellers. This request 32 may include the position of the buyer 30. The server 20 searches its memory for offers corresponding to positions in proximity of the buyer's 30 position and returns to the buyer a list of offers and associated sellers.

Figure 3:
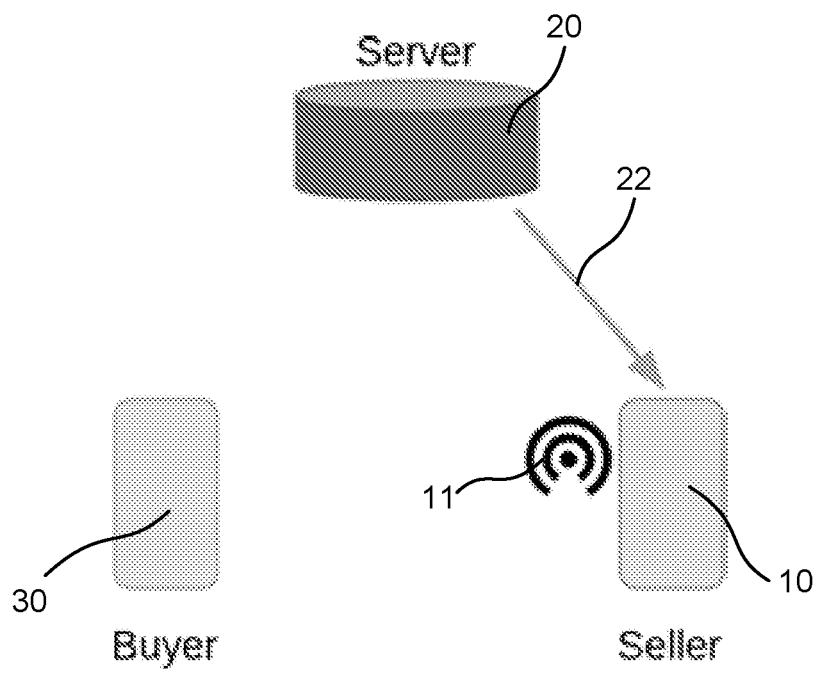

As illustrated in FIG. 3, the server 20 sends a message 22 to one or more sellers 10 returned in the previous step and instructs them to temporarily enable their short-range communications means 11 (e.g., by activating their WiFi or Bluetooth hotspot function), if not already enabled. Consequently, a seller 10 does not need to continuously broadcast radio and/or sound waves to indicate its presence, thereby conserving battery power when no buyer 30 is nearby or when no mutually beneficial exchange can take place.

Figure 4:
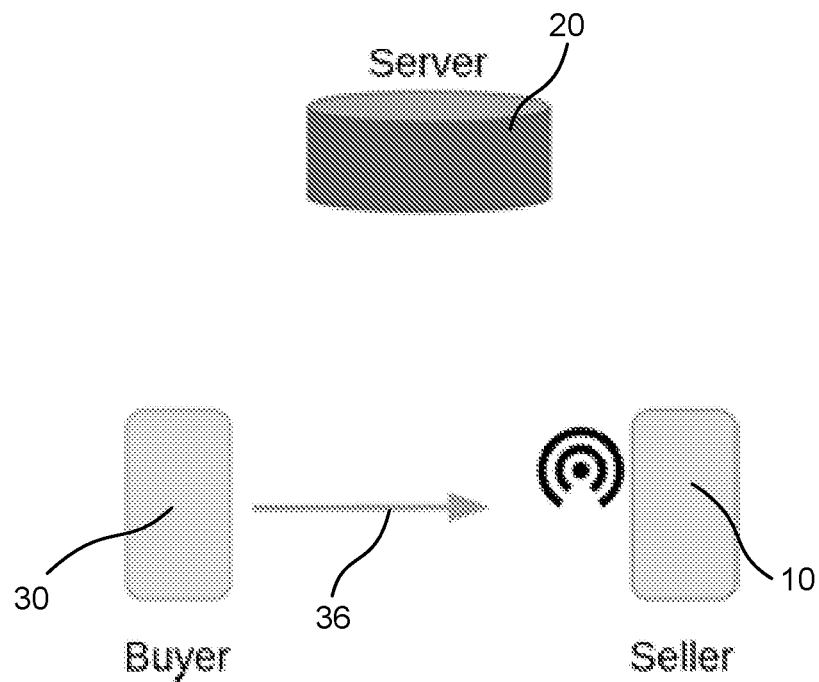

As illustrated in FIG. 4, optionally, the buyer 30 may scan for short-range communication networks (e.g., WiFi, Bluetooth, etc.) to verify that sellers returned in step of FIG. 2 are actually within short-range connectivity.

As also illustrated in FIG. 4, the buyer connects 36 to the seller 10. Advantageously, the seller 10 may be selected on the base of the highest received signal strength with respect to wide area network base station(s), local area network access point(s), etc. If required, a password, for example received from the server 20, may be used in order to access the seller's 10 hotspot. Note that, although this example shows only one buyer, several buyers may simultaneously connect to the same seller.

Figure 5:
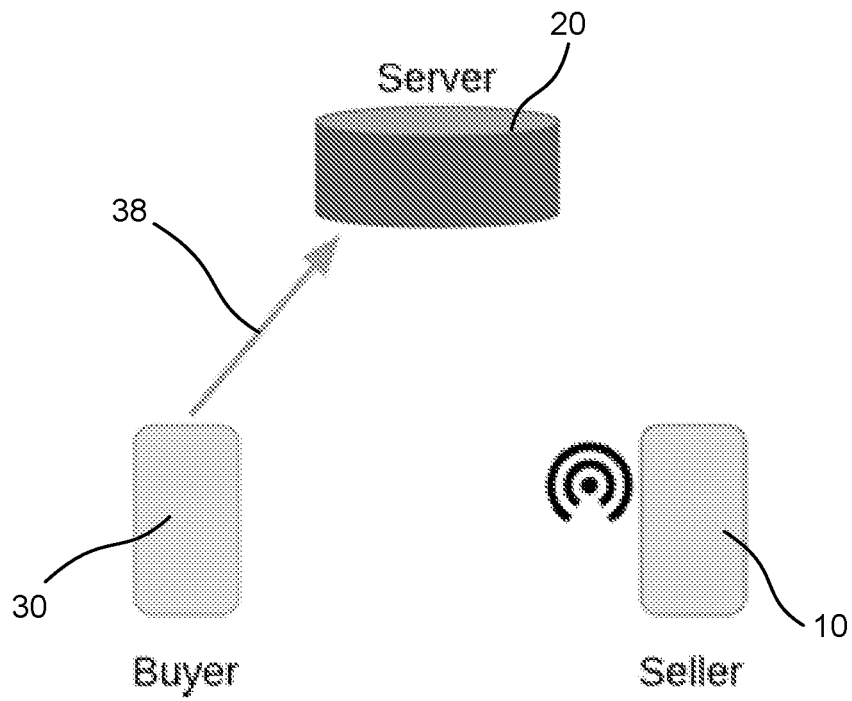

As illustrated in FIG. 5, optionally, while the connection 36 is active, the buyer 30 may report 38 to the server 20 the amount of mobile data purchased.

Figure 6:
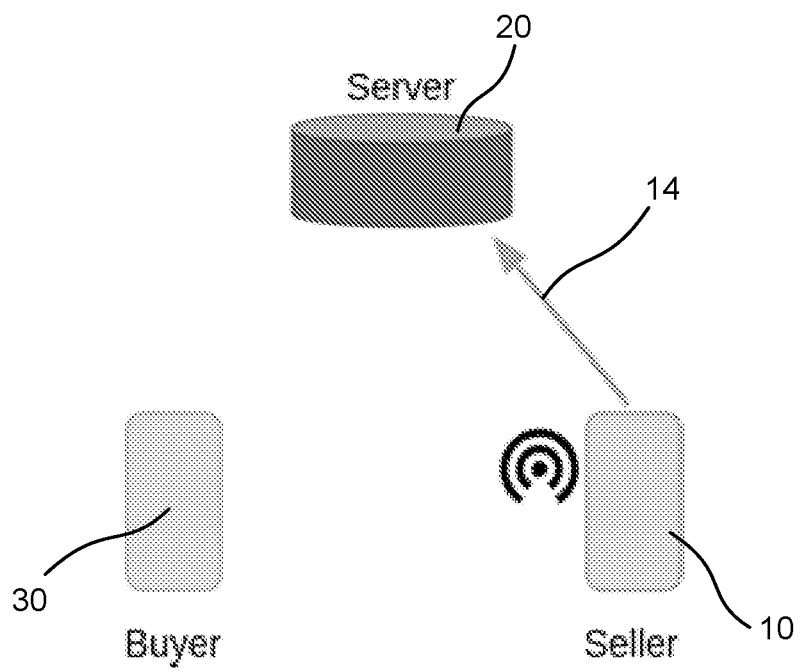

As illustrated in FIG. 6, optionally, while the connection 36 is active, the seller 10 may report 14 to the server 20 the amount of mobile data sold, so that the information sent from the buyer 30 to the server 20 can be verified.

Figure 7:
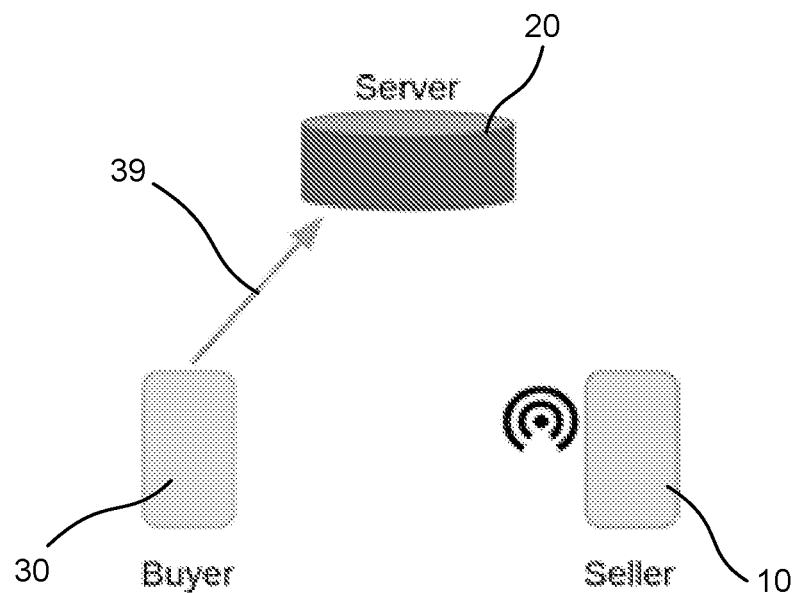

As illustrated in FIG. 7, once the buyer 30 has used/bought the needed amount of mobile data, a message 39 is sent to the server 20, instructing it to disconnect the connection 36.

Figure 8:
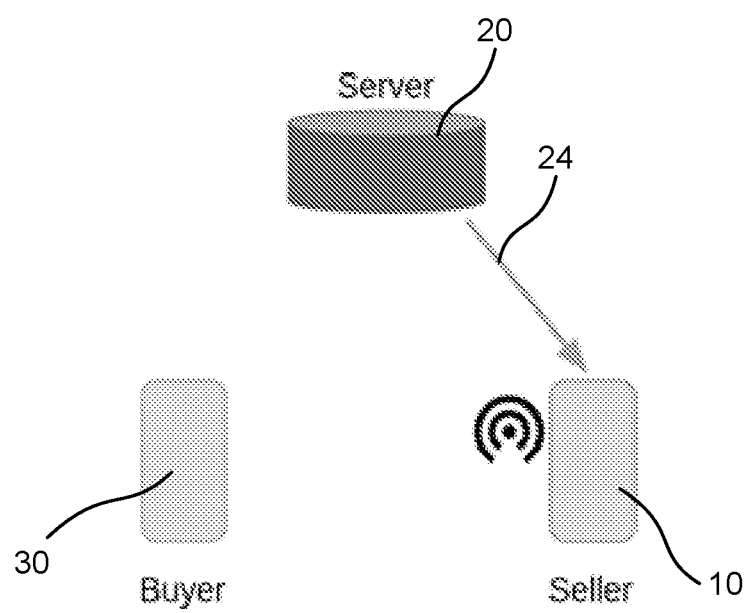

As illustrated in FIG. 8, the server 20 notifies 24 the seller 10 of the disconnection by instructing it to disable its short-range communication means (e.g., by inactivating its WiFi or Bluetooth hotspot function).

Note that the steps of the method do not necessarily need to be carried out in the order described above but may also be performed in a different order and/or simultaneously.

The person skilled in the art realizes that the present invention by no means is limited to the preferred embodiments described above. On the contrary, many modifications and variations are possible within the scope of the appended claims.

Advantageously, the system may monitor the connection between buyer 30 and seller 10 to prevent fraud and/or to store a record of the connection that can be used for billing purposes and/or for settling payment disputes between buyers and sellers. For example, the server 20 may terminate the connection if the buyer and seller's reported data count do not match or if other fraudulent behaviors are detected. Thus, the invention provides increased security, e.g., compared to open WiFi solutions, typically used in public places, since user information such as payment information and/or position may be stored in the server 20 and can be used to block malicious users from using the system.

Advantageously, the seller 10 may automatically or manually terminate the connection when the data shared with the buyer 30 has reached or has overcome a predetermined threshold.

Advantageously, the buyer's hotspot configuration may be removed in order to increase the security of the system.

Advantageously, the seller's hotspot configuration including a password may be automatically or manually changed in order to increase the security of the system.

Advantageously, the connection security and the user anonymity may be increased by using a VPN service for buyers, which would eliminate a malicious seller's possibility to monitor traffic, in addition to separating buyer and seller's data channels and therefore also their online actions.

Advantageously, the cell ID associated to buyers and sellers may be used to detect proximity, with the advantage that buyers and sellers do not need to activate their GPS receivers and can thus preserve their battery. Nevertheless, note that any other positioning technique can be used for estimating the position of buyers and sellers.

Advantageously, a set of WiFi BSSIDs that are within WiFi range can be sent to the server 20, so that the server 20 can compute the intersection of the buyer and seller's set, thus detecting proximity, with the advantage that proximity can be accurately determined already in step of FIG. 2, reducing or removing the need for steps of FIGS. 3 and 4.

Advantageously, Bluetooth Low Energy, Wi-Fi Direct or Wi-Fi Aware may be used to detect proximity and/or to exchange the information needed to establish a connection, with the advantage of reducing or removing the need for steps of FIGS. 1-3 and FIG. 9 as well as the system's restriction of limited data access to establish a connection.

The buyer, the seller or the server may terminate the connection between buyer and the seller when a predetermined amount of data is used by the buyer. This may be made without the need to send instructions from the buyer to the seller.

Note that the method could also run by enabling direct short-range communications between sellers and buyers, without a need for the server.

Additionally, variations to the disclosed embodiments can be understood and effected by the skilled person in practicing the claimed invention, from a study of the drawings, the disclosure, and the appended claims.

The invention claimed is:

1. A method for setting up a connection between a seller device and a buyer device for enabling the buyer device to send and receive data via the seller device, the method comprising:
   sending, from the seller device to a server, data pertaining to an offer, the data pertaining to the offer including an identification of the seller device and a position of the seller device;
   storing the data pertaining to the offer in a memory of the server, the memory being configured to store data pertaining to at least one offer from at least one seller device;
   sending, from the buyer device to the server, a request for a list of nearby seller devices, wherein the request includes a position of the buyer device;
   at the server, compiling, from the data pertaining to the at least one offer stored in the memory, the list of nearby seller devices, by identifying one or more seller devices being positioned in proximity of the position of the buyer device, the list of nearby seller devices comprising the data pertaining to the offers of the identified one or more seller devices;
   sending, from the server to the buyer device, the list of nearby seller devices;
   sending, from the buyer device to at least one of the seller devices of the list of nearby seller devices, a connection request for connecting the buyer device to the at least one of the seller devices, enabling the buyer device to send and receive data via the seller;
   while the connection is active, reporting, from the buyer device to the server, the amount of data sent and received by the buyer device and reporting, from the at least one of the seller devices to the server, the amount of data sent and received by the buyer device; and
   upon the amount of data sent and received by the buyer device reported by the buyer device and the at least one of the seller devices substantially differ, terminating the connection between the buyer device and the at least one of the seller devices.

2. The method according to claim 1, further comprising sending a set of WiFi BSSIDs that are within WiFi range of the seller device to the server, wherein the act of identifying the one or more sellers being positioned in proximity of the position of the buyer is based on a computation of an intersection of the buyer and sellers set.

3. The method according to claim 1, further comprising sending, from the server to at least one of the seller devices of the list of nearby seller devices, an instruction to enable a short-range communications means of the at least one of the seller devices.

4. The method according to claim 1, further comprising scanning, by the buyer device, for devices within short-range communication to verify that the at least one seller device of the list of nearby seller devices is actually within short-range connectivity.

5. The method according to claim 1, wherein the data pertaining to the offer further includes a channel quality indicator with respect to a network node the seller device being connected to, wherein the method further comprises: selecting, at the buyer device, the at least one of the seller devices of the list of nearby seller devices to send the connection request to, based on the channel quality indicator of the seller devices of the list of nearby seller devices.

6. The method according to claim 1, wherein the data pertaining to the offer further includes a channel quality indicator with respect to a network node the seller device being connected to, wherein the act of identifying the one or more seller devices being positioned in proximity of the position of the buyer device is based on the channel quality indicator of the seller devices.

7. The method according to claim 1, further comprising, upon the buyer device has used a predetermined amount of data, sending, from the buyer device to the server, a message comprising instructions to disconnect the connection.

8. The method according to claim 7, further comprising notifying, by the server, the seller device of the disconnection by instructing it to disable a short-range communication means of the seller device.

9. The method according to claim 1, further comprising, upon the amount of data sent and received by the buyer device has reached a predetermined threshold, terminating, by the seller device, the connection between the buyer device and the seller device.

10. A method for providing a buyer device with at least one seller device, the method comprising:
   receiving, from a seller device data pertaining to an offer, the data pertaining to the offer including an identification of the seller device and a position of the seller device;
   storing the data pertaining to the offer in a memory of the server, the memory is configured to comprise data pertaining to at least one offer from at least one seller device;
   receiving, from a buyer device, a request for a list of nearby seller devices, wherein the request includes a position of the buyer device;
   compiling, from the data pertaining to at least one offer stored in the memory, the list of nearby seller devices, by identifying one or more seller devices being positioned in proximity of the position of the buyer device, the list of nearby seller devices comprising the data pertaining to the offers of the identified one or more seller devices;
   sending, to the buyer device, the list of nearby seller devices;
   while a connection is active between the buyer device and a seller device, receiving, from the buyer device, the amount of data sent and received by the buyer device and receiving, from the seller device, the amount of data sent and received by the buyer device; and
   upon a determination that the amount of data sent and received by the buyer device reported by the buyer device and the seller device substantially differ, terminating the connection between the buyer device and the seller device.

11. The method according to claim 10, wherein the act of identifying the one or more seller devices being positioned in proximity of the position of the buyer device is based on the position of the one or more seller devices and the position of the buyer device.

12. The method according to claim 10, further comprising:
   receiving a set of WiFi BSSIDs that are within WiFi range of the seller device; and
   identifying the one or more seller devices being positioned in proximity of the position of the buyer device based on a computation of an intersection of the buyer and sellers set.

13. The method according to claim 10, further comprising sending, to at least one of the seller devices of the list of nearby seller devices, instructions to enable a short-range communications means of the at least one of the seller devices.

14. The method according to claim 10, further comprising upon receipt of a disconnection message from the buyer device notifying the seller device to disconnect the buyer device.

15. A server configured to:
   from a seller device receive data pertaining to an offer, the data pertaining to the offer including an identification of the seller device and a position of the seller device;
   store the data pertaining to the offer in a memory of the server, the memory is configured to comprise data pertaining to at least one offer from at least one seller device;
   from a buyer device receive a request for a list of nearby seller devices, wherein the request includes a position of the buyer device;
   compile, from the data pertaining to at least one offer stored in the memory, the list of nearby seller devices, by identifying one or more seller devices being positioned in proximity of the position of the buyer device, the list of nearby seller devices comprising the data pertaining to the offers of the identified one or more seller devices;
   send the list of nearby seller devices to the buyer device;
   while a connection is active between the buyer device and a seller device, receive, from the buyer device, the amount of data sent and received by the buyer device and receive, from the seller device, the amount of data sent and received by the buyer device; and
   upon a determination that the amount of data sent and received by the buyer device reported by the buyer device and the seller device substantially differ, terminate the connection between the buyer device and the seller device.

* * * * *